United States Patent
Kuo et al.

(10) Patent No.: US 6,503,591 B2
(45) Date of Patent: Jan. 7, 2003

(54) REPOSITIONABLE DOUBLED-SIDED ADHESIVE PAD HAVING A DISPLAY

(75) Inventors: Tsung-Tien Kuo, Kaohsiung Hsien (TW); Jen-Rong Liu, Kaohsiung Hsien (TW); Ho-Tsai Lin, Kaohsiung (TW); Ho-Chi Chen, Kaohsiung (TW)

(73) Assignee: Taiwan Hopax Chems, Mfg. Col., Ltd., Kaohsiung Hsien (TW)

( * ) Notice: Subject to any disclaimer, the term of this patent is extended or adjusted under 35 U.S.C. 154(b) by 44 days.

(21) Appl. No.: 09/778,655

(22) Filed: Feb. 7, 2001

(65) Prior Publication Data

US 2002/0106471 A1 Aug. 8, 2002

(51) Int. Cl.⁷ .............................. B32B 9/00; G09F 3/10
(52) U.S. Cl. ...................... 428/41.9; 40/768; 40/773; 283/81; 428/40.1; 428/41.3; 428/41.7; 428/41.8; 428/42.1; 428/42.2; 428/42.3; 428/43; 428/317.7; 428/319.3; 428/319.7
(58) Field of Search ................... 428/40.1, 41.3, 428/41.7, 41.8, 41.9, 42.1, 42.2, 42.3, 43, 317.7, 319.3, 319.7; 40/768, 773; 283/81

(56) References Cited

U.S. PATENT DOCUMENTS

| | | | | |
|---|---|---|---|---|
| 5,268,228 A | * | 12/1993 | Orr | 428/343 |
| 5,622,761 A | | 4/1997 | Cole | 428/42.1 |
| 5,965,225 A | | 10/1999 | Torres | 428/40.1 |
| 6,090,461 A | * | 7/2000 | Frank | 428/40.1 |

* cited by examiner

Primary Examiner—Nasser Ahmad
(74) Attorney, Agent, or Firm—Hamilton, Brook, Smith & Reynolds, P.C.

(57) ABSTRACT

An adhesive pad includes a substrate, a releaseable first adhesive layer disposed on one side of the substrate and having a first degree of tackiness, a first piece of release paper overlying the first adhesive layer, a display layer bonded adhesively to the other side of the substrate, a releaseable second adhesive layer disposed on the display layer and having a second degree of tackiness which is lower than the first degree of tackiness, and a second piece of release paper covering the second adhesive layer.

6 Claims, 4 Drawing Sheets

REPOSITIONABLE DOUBLED-SIDED ADHESIVE PAD HAVING A DISPLAY

BACKGROUND OF THE INVENTION

1. Field of the Invention

The invention relates to a repositionable adhesive pad which can be removed from a support to which the adhesive pad is attached for repositioning of the adhesive pad. More particularly, the invention relates to a repositionable double-sided adhesive pad which has two sides provided with releaseable adhesive layers having different degrees of tackiness and which additionally includes a display layer for use as an ornament, advertisement or indicator.

2. Description of the Related Art

A self-sticking double-sided tape typically includes two opposite adhesive layers provided on two sides of a substrate made of a synthetic polymeric material, and two pieces of release paper respectively covering the two adhesive layers to protect the same from contaminants and dust. After the pieces of release paper are removed, the substrate can be used to adhere to two objects at two sides thereof. Generally, one side of the substrate is attached to a fixed support while the other side thereof is adapted to hold an object.

The double-sided tapes generally exist in two forms, one being linerless, and the other being provided with a liner that is generally made of a foamed material. A double-sided tape 2 shown in FIG. 1 has a foam layer 21 which serves as a liner two sides of which are coated with two adhesive layers 22 covered by pieces of release paper(not shown). FIG. 2 shows a linerless double-sided adhesive tape 1 which includes an adhesive layer 11 of a strong adhesive two sides of which are respectively covered by two pieces of release paper (not shown).

The adhesion of both adhesive tapes 1, 2 is attributable to the adhesive layers 11, 22 which are usually formed from an adhesive having high tackiness. In use, one side of the double-sided tape 1 or 2 is stuck to a fixed support 14 or 25, while the other side thereof is used for attachment of an object 13 or 24. Due to the high tackiness of the adhesive, it is difficult to remove the object from the support. When the object is removed forcefully from the support, the object 13 or 24 can be damaged, and the adhesive will leave residue on the damaged part of the object, which is hard to remove. On the other hand, if the support 14 or 25 is a wall which is covered by wall paper or paint, removal of the adhesive tape 1 or 2 will result in peeling of the wall paper or the paint, thus significantly affecting the appearance of the wall.

Attempts were made in the art to develop a repositionable double-sided adhesive tape or pad by using releaseable pressure-sensitive adhesives. U.S. Pat. No. 5,622,761 discloses a double-sided adhesive sheet two opposite sides of which are respectively provided with releaseable pressure-sensitive adhesives having different degrees of releaseability. The side of the sheet with the adhesive of lower releaseability is adapted for attachment to a fixed surface, such as a wall or board, whereas the other side with the adhesive having higher releaseability is used for holding or bonding an object. The pressure-sensitive adhesive on the adhesive sheet permits the latter to be removed from the fixed surface so that the adhesive sheet can be repositioned on another surface. In addition, removal of the object from the adhesive sheet is permitted without damaging the object.

U.S. Pat. No. 5,965,225 discloses a pad having multiple note sheets secured together as a superimposed stack, wherein each note sheet has two sides thereof provided with a pressure-sensitive adhesive and includes an adhesive-free area for marking or writing. The adhesive-free area is folded so that the adhesive on one side is covered by the folded adhesive layer and is prevented from sticking to an adjacent sheet.

Although the double-sided adhesive sheets or pads suggested in the art offer the repositioning effect and facilitate removal of the objects attached to the sheets or pads, it is still desirable that improvements be made for double-sided adhesive pads so as to enable the same to have ornamenting, advertising and/or indicating functions.

SUMMARY OF THE INVENTION

An object of the present invention is to provide a repositionable double-sided adhesive pad which not only functions to hold or retain releaseably an object but also functions to provide a displaying effect.

According to the present invention, an adhesive pad comprises a pad body which includes: a substrate; a releaseable first adhesive layer disposed on one side of the substrate and having a first degree of tackiness; a first piece of release paper overlying the first adhesive layer; a display layer bonded adhesively to the other side of the substrate; a releaseable second adhesive layer disposed on the display layer and having a second degree of tackiness which is lower than the first degree of tackiness; and a second piece of release paper covering the second adhesive layer.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
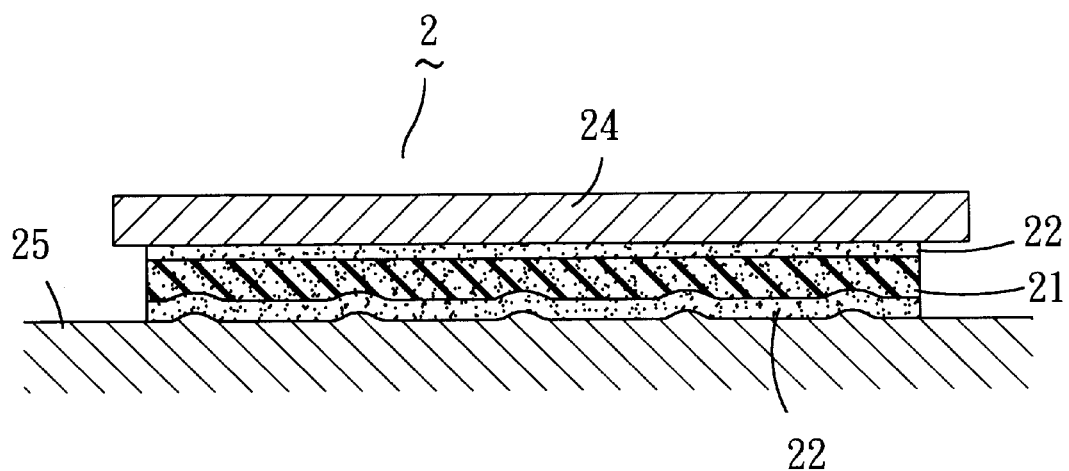
FIG. 1 shows a double-sided adhesive sheet in the art.
Figure 2:
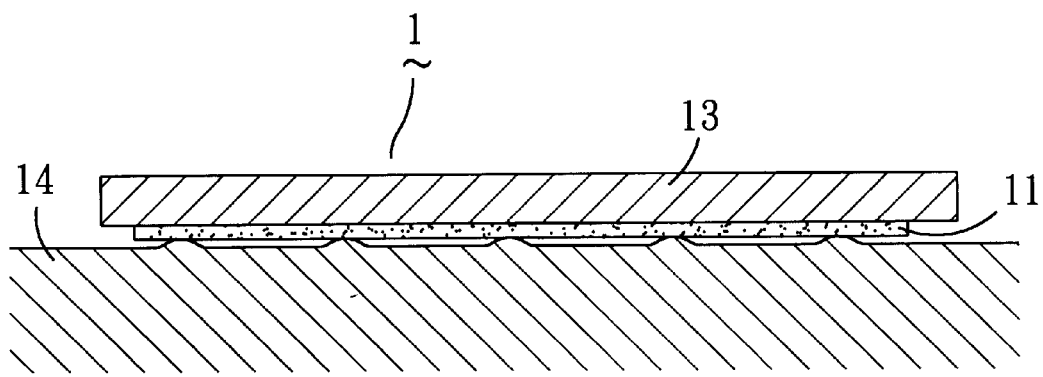
FIG. 2 shows another double-sided adhesive sheet in the art.
Figure 3:
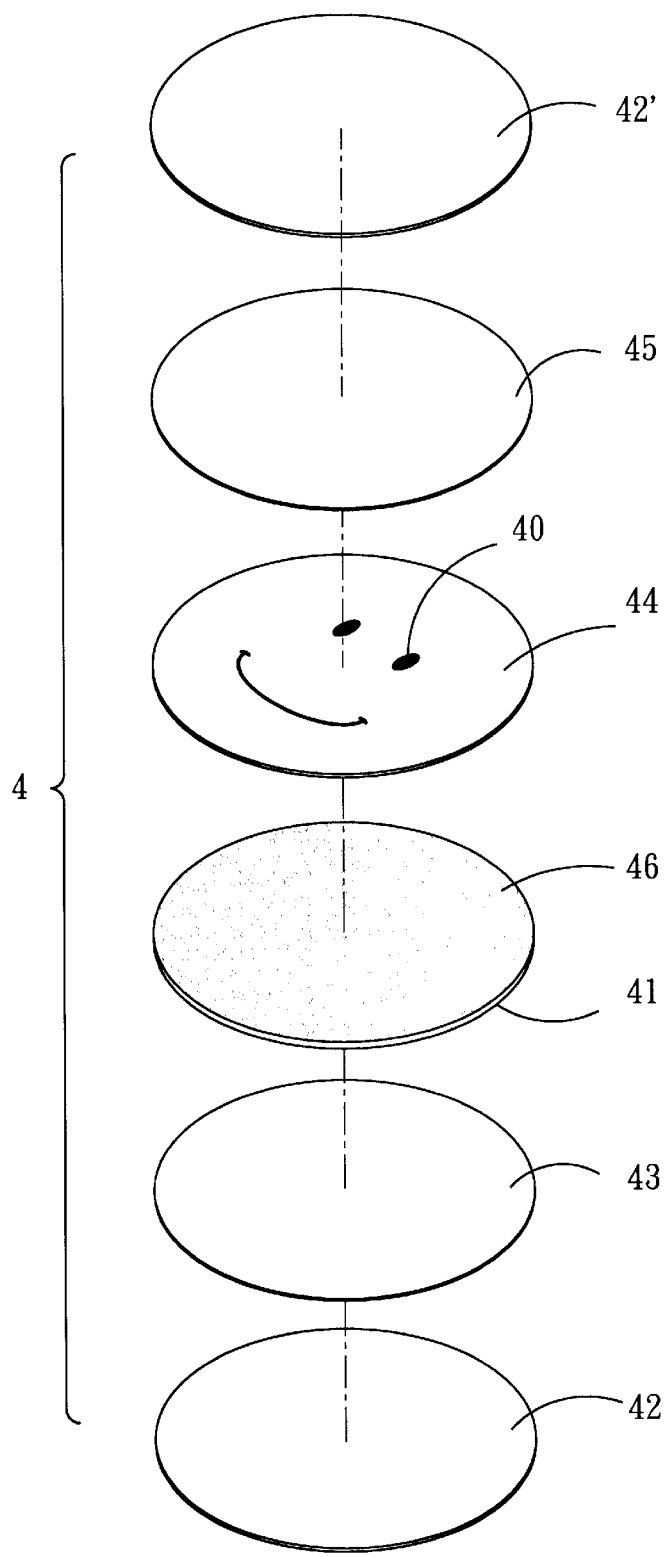
FIG. 3 is an exploded view of a preferred embodiment of an adhesive pad according to the present invention.
Figure 5:
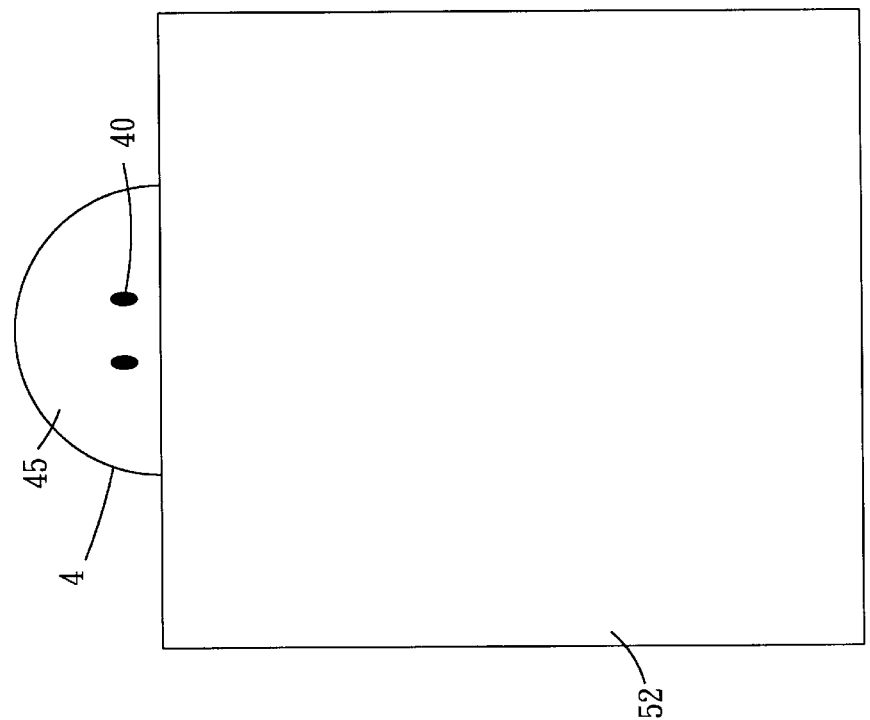
FIG. 5 is an elevation view showing the adhesive pad of FIG. 3 in use.
Figure 4:
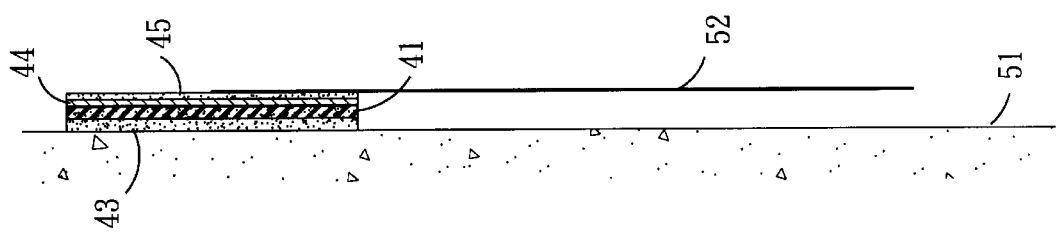
FIG. 4 is a section view showing the adhesive pad of FIG. 3 in a state of use.

Referring to FIGS. 3 to 5, an adhesive pad 4 embodying the present invention is shown to include a foamed substrate 41, a releaseable first adhesive layer 43 disposed on one side of the foamed substrate 41 (e.g. PVC foam), a first piece of release paper 42 covering the first adhesive layer 43, a display layer 44 bonded adhesively and permanently to the other side of the foamed substrate 41 via adhesive 46, a releaseable second adhesive layer 45 applied to the display layer 44, and a second piece of release paper 42' covering the second adhesive layer 45. The releaseable first and second adhesive layers 43 and 45 are formed from a pressure-sensitive adhesive. The first adhesive layer 43 has a thickness greater than that of the second adhesive layer 45 and thus possesses a higher degree of tackiness as compared to the second adhesive layer 45. The pressure-sensitive adhesive used in the present invention comprises microparticles, such as elastic polymeric microspheres. Since the pressure-sensitive adhesive is conventional, it is not detailed herein for the sake of brevity.

While the substrate 41 as shown is a piece of foam, other materials, such as paper, a plastic film (e.g. polyethylene, polyethylene vinylacetate, polyvinylchloride), or rubber may be used in the present invention in place of the foam. The display layer 44 may be made of paper or a plastic film, and has a display surface 40 which may be provided with a pattern, such as a picture, a character or the like. In this embodiment, the display surface 40 has a printed colored picture. The second adhesive layer 45 is transparent so that the picture on the display surface 40 can be viewed through the second adhesive layer 45.

In use, the first release paper 42 is first removed from the adhesive pad 4 to expose the first adhesive layer 43 so that the adhesive pad 4 can be attached to a support, such as the surface of a bulletin board 51. The adhesive pad 4 can be attached firmly to the wall 5 since the foamed substrate 41 which is flexible and resilient can be in intimate contact with the surface of the support 51. In addition, as the first adhesive layer 43 is releaseable, it is convenient for the adhesive pad 4 to be repositioned by detaching the adhesive pad 4 from the support 51 and re-attaching the same to another support surface.

When the second release paper 42' is removed to expose the second adhesive layer 45, an object such as a note sheet 52 can be attached to the adhesive pad 4 through the second adhesive layer 45. As the second adhesive layer 45 is releaseable, the note sheet 52, after use, can be detached from the adhesive pad 4 to permit attachment of another note sheet. The ornamenting picture on the display surface 40 is visible through the second adhesive layer 45 which is transparent, thus providing an ornamenting effect. In addition to the ornamenting picture, other markings such as a trakemark, symbol, or character may be disposed on the display surface 40 for advertising and/or indicating purposes.

Figure 6:
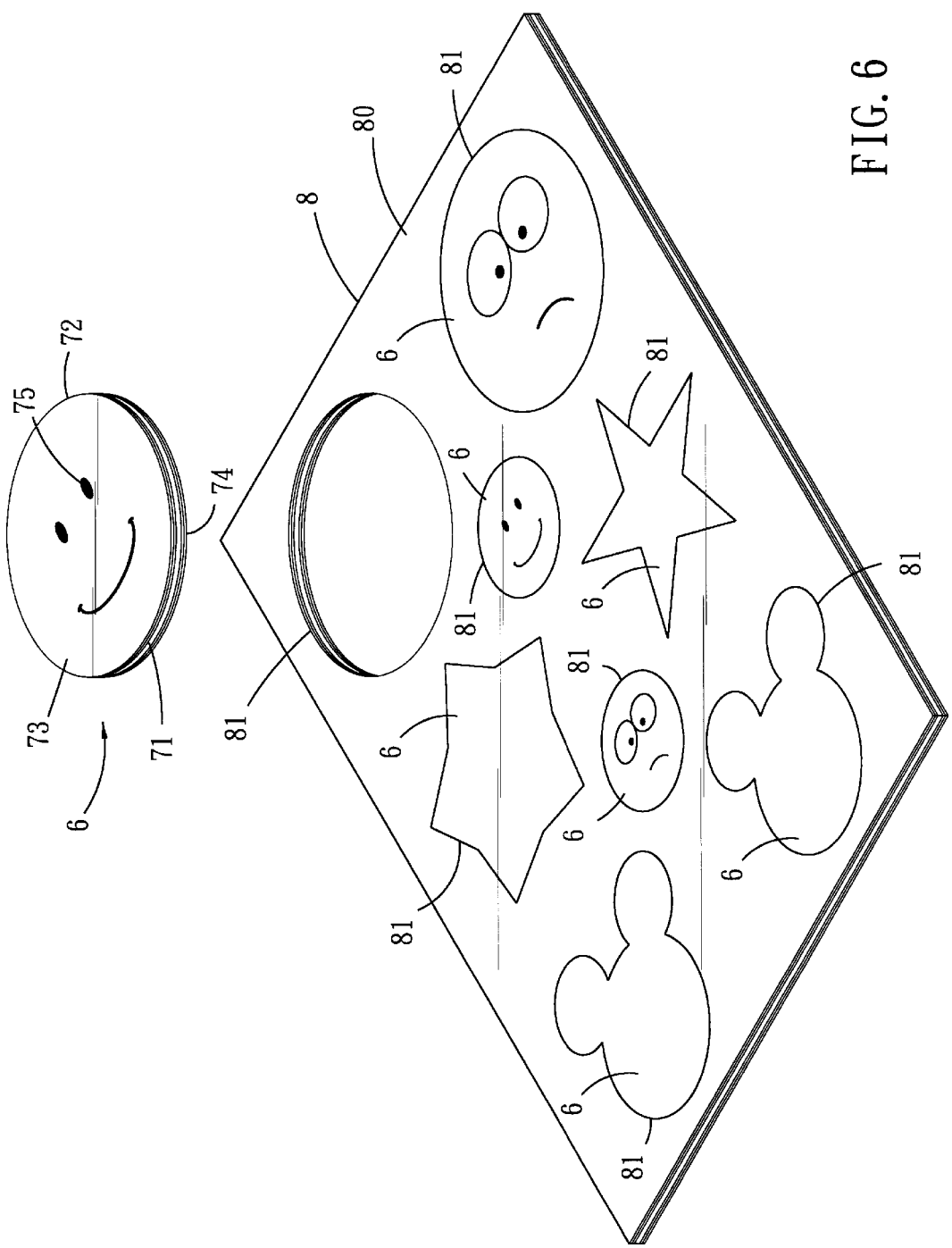
FIG. 6 is a perspective view illustrating another preferred embodiment of the present invention.

FIG. 6 shows another embodiment of the present invention which is formed as a multi-piece adhesive pad 8. The structure of the multi-piece adhesive pad 8 is substantially similar to the adhesive pad 4 of the previous embodiment. Like the adhesive pad 4, the adhesive pad 8 includes a foamed substrate 71 which incorporates at one side thereof a first adhesive layer 74 covered by a first release paper (not shown) and at the other side thereof a display layer 75 with a second adhesive layer 73 covered by a second release paper 72. The adhesive pad 8 is die cut to form a plurality of pad segments 6 which have different shapes including circular and star-like shapes. A coupling portion 80 is thus formed around the pad segments 6 and defines a plurality of tearing seams 81 extending around the corresponding pad segments 6. The coupling portion 80 functions to retain the pad segments 6 when the pad segments 6 are packaged. The tearing seams 81 permit the pad segments 6 to be separated from the coupling portion 80 when the pad segments 6 are to be used.

The display layer 75 may be prepared by printing a paper sheet or a plastic film. The printed paper sheet or plastic film is then adhered to a foamed sheet, such as a foamed polyethylene vinyl acetate, by adhering and pressing the printed paper sheet or plastic film onto the foamed sheet via a lamination process. Fabrication of the adhesive pad 8 is completed after pressure-sensitive adhesives having different degrees of tackiness are respectively provided on the printed side of the printed paper sheet or plastic film and the opposite side of the foamed sheet and after the adhesives are covered by release paper.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An adhesive pad comprising:

a pad body which includes a substrate, a releaseable first adhesive layer disposed on one side of said substrate and having a first degree of tackiness, a first piece of release paper overlying said first adhesive layer, a display layer bonded adhesively to the other side of said substrate, wherein said display layer is made of a material selected from the group consisting of a paper sheet and a plastic film, said material being printed, a releaseable second adhesive layer disposed on said display layer and having a second degree of tackiness which is lower than said first degree of tackiness, and a second piece of release paper covering said second adhesive layer.

2. The adhesive pad as claimed in claim 1, wherein said substrate is a foamed substrate.

3. The adhesive pad as claimed in claim 1, wherein said second adhesive layer is transparent so as to permit viewing of said display layer.

4. The adhesive pad as claimed in claim 3, wherein said pad body is die-cut to form a plurality of pad segments.

5. The adhesive pad as claimed in claim 4, wherein said pad segments have different shapes.

6. The adhesive pad as claimed in claim 5, wherein said pad body further includes a coupling portion which surrounds and retains said pad segments, said coupling portion defining a plurality of tearing seams each extending around a corresponding one of said pad segments to permit said corresponding one of said pad segments to be removed from said coupling portion.

\* \* \* \* \*